United States Patent [19]

Anne

[11] Patent Number: 4,499,518

[45] Date of Patent: Feb. 12, 1985

[54] PROCESS FOR THE PRODUCTION OF AN ELECTRONIC COMPONENT ENCLOSED IN A HOUSING AND APPARATUS FOR CARRYING OUT THE PROCESS

[75] Inventor: Jean Anne, Bagnolet, France

[73] Assignee: L.C.C.-C.I.C.E. Compagnie Europeenne de Composants Electroniques, Bagnolet, France

[21] Appl. No.: 449,695

[22] Filed: Dec. 14, 1982

[30] Foreign Application Priority Data

Dec. 31, 1981 [FR] France ................................ 81 24578

[51] Int. Cl.$^3$ .......................... H01G 1/14; H01G 7/00
[52] U.S. Cl. ...................................... 361/306; 29/25.42
[58] Field of Search ....................... 361/306, 307, 314; 29/25.41, 25.42; 427/79

[56] References Cited

U.S. PATENT DOCUMENTS

| | | | |
|---|---|---|---|
| 3,086,149 | 4/1963 | Baron | 361/306 X |
| 3,117,297 | 1/1964 | De Gier | 361/306 X |
| 3,394,441 | 7/1968 | Weiss | 427/79 X |
| 3,411,193 | 11/1968 | Takacs | 29/25.41 |

FOREIGN PATENT DOCUMENTS

| | | | |
|---|---|---|---|
| 920673 | 2/1973 | Canada | 361/306 |
| 311395 | 1/1956 | Switzerland | 361/306 |

Primary Examiner—Donald A. Griffin
Attorney, Agent, or Firm—Cushman, Darby & Cushman

[57] ABSTRACT

A process for the production of an electronic component wherein electrical connections are soldered to the lateral sides of the component, after which the latter is introduced into a housing and a solidifiable resin is cast around the component in the housing. According to the invention, the connections are firstly produced in the form of a hairpin comprising two parallel branches interconnected via their first extremity, whereafter a convex part is formed on each branch towards their second extremities, so that after the second extremities are soldered to the lateral sides of the component, the distance between the convex parts and their position on each of the branches permits their insertion together with the component into the housing, the friction of the said convex parts against the inner sides of the housing being sufficient for holding together the housing and the component.

26 Claims, 9 Drawing Figures

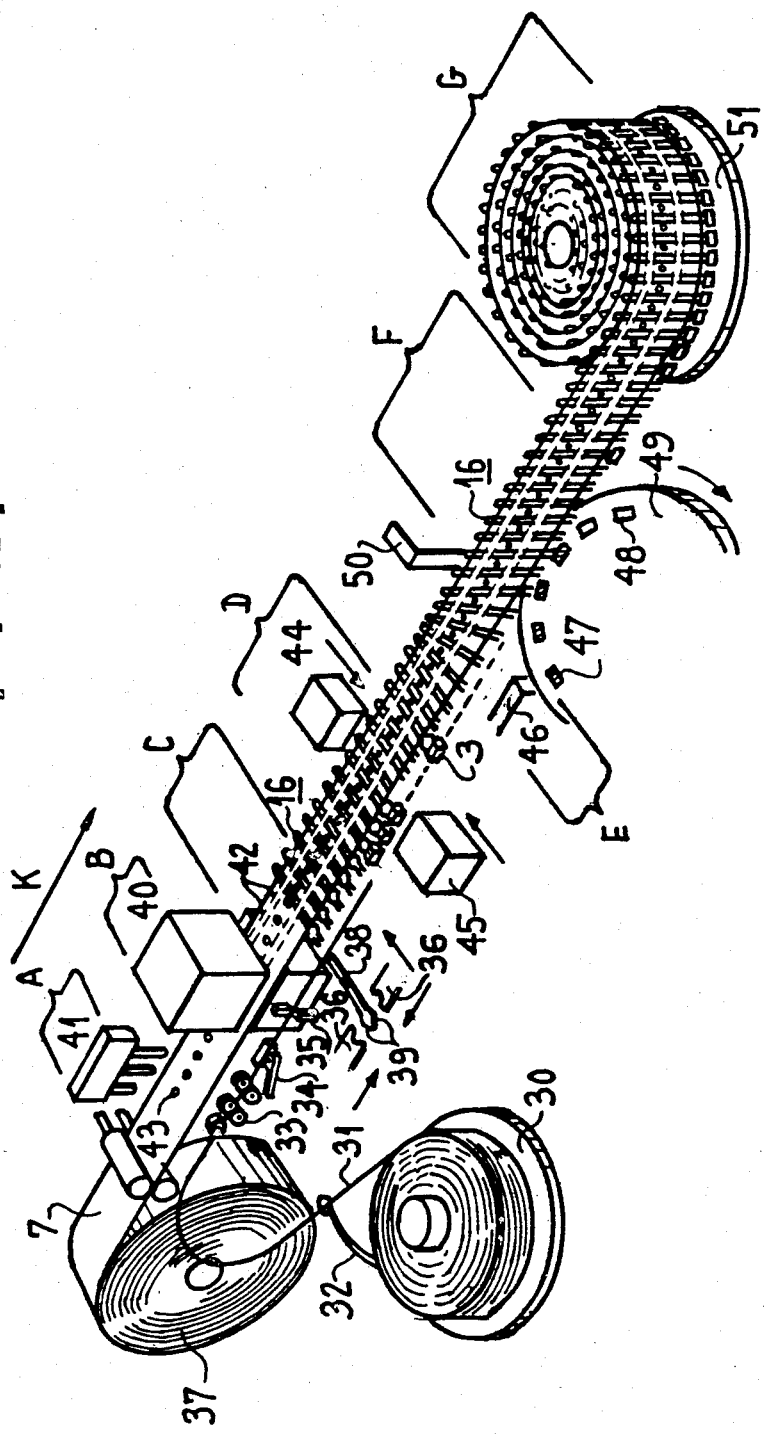

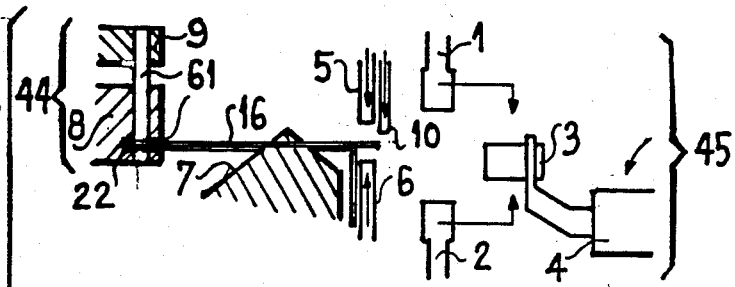
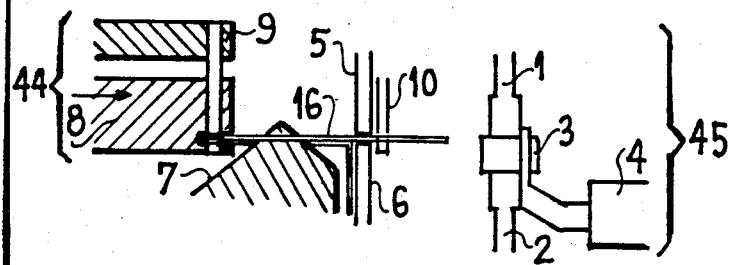
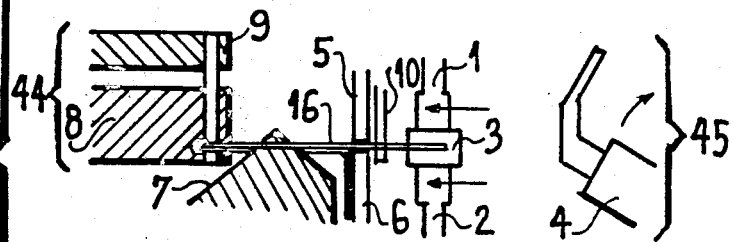
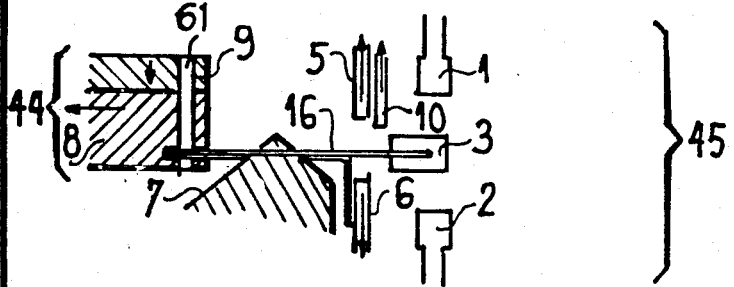
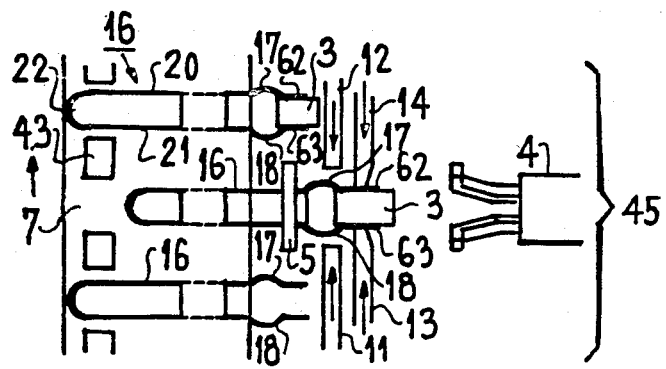

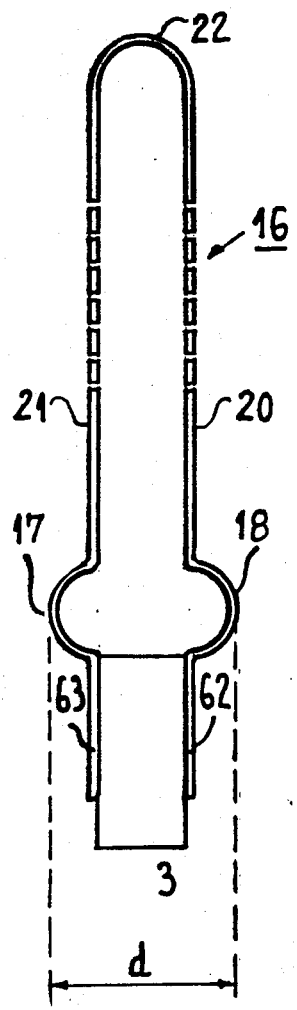
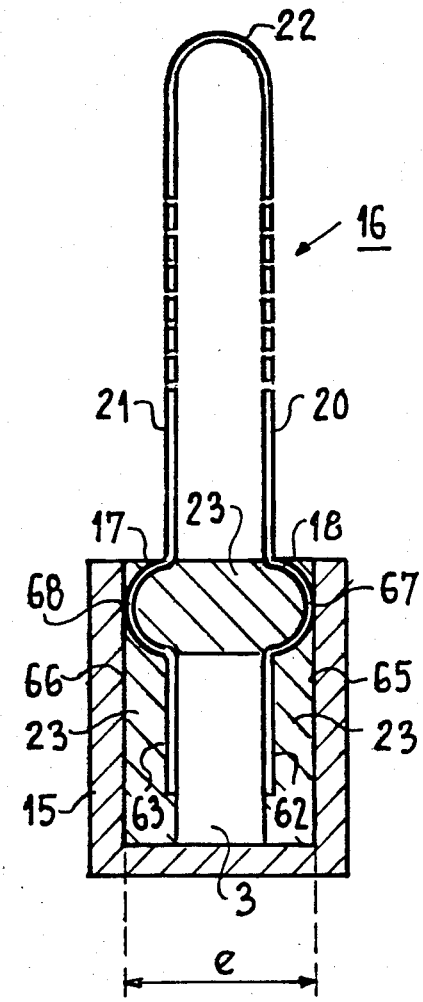
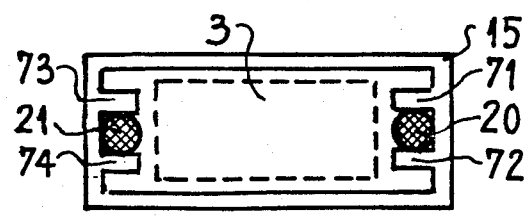

PROCESS FOR THE PRODUCTION OF AN ELECTRONIC COMPONENT ENCLOSED IN A HOUSING AND APPARATUS FOR CARRYING OUT THE PROCESS

The present invention relates to a process for the production of an electronic component, wherein electrical connections are soldered to the sidewalls of the component, after which the latter is inserted into a protective housing, the component and its connections being secured within the housing by casting a solidifiable resin into this latter.

BACKGROUND OF THE INVENTION

A production process of this kind is known for an electronic component, in particular for the encapsulation of transistors or discrete semiconductor elements in general. In the sphere of capacitors, to which the process of the invention more specifically relates, it is equally known to produce capacitors by consecutive stacking of metallised dielectric layers followed by forming lateral electrical connections, the basic capacitor thus produced then being inserted into a housing containing a liquid resin which sets quickly after insertion of the basic capacitor.

In order to increase the rate of production, the capacitors are commonly handled throughout the production stages by means of perforated cardboard straps into which are slipped the connections of the said capacitors. Allowing for the presence of the liquid resin at the instant of insertion of the component into the housing, a correct encapsulation requires having the opening of the housing pointing upwards to prevent resin spillage. After insertion of the component into the housing, which insertion is performed downwards from above, it is appropriate to wait for the resin to set before handling the component to prevent separation between the housing and the rough capacitor. This waiting period is perforce protracted and proportionally delays the delivery of the production line. As a matter of fact, a resin which sets too rapidly cannot be selected, since the insertion of the component into the housing then becomes an extremely delicate operation.

To avoid this disadvantage, it has been proposed to utilise a housing having an upwardly directed aperture and two holes in the bottom surface permitting the passage of the capacitor connections. The said connections are then inserted into the holes until the capacitor has entered the housing, after which the resin is cast into the housing, the said resin setting during the subsequent production stages without any mechanical stress then being exerted on the said resin. A process of this kind does not, however, permit utilising capacitors mounted on straps or the like, since the connections have a hairpin shape in this case, of which the branches are interconnected via a first extremity and soldered via their second extremity to the lateral surfaces of the capacitor. Furthermore, a process of this kind requires precise adjustment of the connections and of the holes situated in the lower surface of the housing, a lack of precision commonly resulting in damaging the connections and rejection of the corresponding workpiece. Moreover, the holes in the lower surface should not have too great a diameter because the risk would then be incurred of causing a leak of resin through these holes and thereby spoiling the production machine.

The process of the invention makes it possible to avoid these disadvantages. It permits the utilisation of conveyor belts or straps for the components whilst authorising a high production rate without the need to await setting of the resin.

SUMMARY OF THE INVENTION

The process of the invention is characterised in that the connections are first produced in the form of a hairpin comprising two parallel branches interconnected via their extremities, whereupon a convex part is formed on each branch towards their second extremity, so that after the second extremities are soldered to the lateral sides of the component, the distance between the convex parts and their position on each of the branches permits their introduction together with the component into the housing, the friction of the said convex parts against the inner sides of the housing being sufficient to hold together the housing and the component.

The fundamental idea of the invention consists in that, based on components of smaller size than the enclosing housing, the component is integrally held to the housing by means of the connections of the component. The latter are formed close to the component and project from the same, in such a manner that they rub against the inner sides of the housing after their insertion together with the component into the said housing.

The housing may be of any desired form (cylindrical, parallelepipedal, etc.) provided that it has a single open side. The latter is upwardly directed in such a manner as to allow injection of solidifiable resin into the housing before and/or after insertion of the component. This housing will preferably also comprise, on its inner surfaces intended to receive the connections, notches for guiding the said connections, of which the shape permits insertion of the component.

The convex parts on the two branches of the hairpin may be formed either successively or simultaneously. Each hairpin is then affixed on the strap or belt. The branches of a pin are then spread apart to insert the component, and then soldered to the same by means of soldering electrodes applied against the lateral surfaces of the component, whilst hammers are striking the convex parts of the connections in such a manner as to space these at a greater predetermined distance (d) than that (e) separating the inner surfaces of the housing. This distance (d) should be such that the component and its connections may be inserted without excessive force which could damage the different elements of the assembly. The distance should, however be sufficient to hold the component and the housing together by means of the connections.

Depending on the kind of housing, of components, etc., simple routine handling actions enable one skilled in the art to match these dimensions to the prevailing problem, as a function of the data given above.

In the process of the invention, the fact that the convex parts of the hairpin hold against the housing by friction despite the weight of the latter permits conveying of the components before the setting of the resin without any risk of separation between the component and housing.

The invention also relates to an electronic component obtained according to the process described above, and in particular a capacitor, as well as to an apparatus for carrying out the said process.

BRIEF DESCRIPTION OF THE DRAWINGS

The invention will now be further described, by way of example, with reference to the accompanying drawings, in which:

FIG. 1 illustrates an overall view of an apparatus for carrying out the process of the invention for production of an electronic component, FIGS. 2A, 2B, 2C, 2D and 2E illustrate the different stages of the process denoted diagrammatically by the reference D in FIG. 1, FIGS. 3A and 3B respectively, illustrate a capacitor equipped with the hairpin connections according to the invention, before and after enclosure within a housing, and FIG. 4 illustrates a cross-section from above of a modification in accordance with the invention.

DESCRIPTION OF THE PREFERRED EMBODIMENTS

FIG. 1 illustrates an embodiment of a production line for electronic components in accordance with the process of the invention. A cardboard belt 7 of appropriate width is unwound from the reel 37 and then perforated by means of the perforating station A, in such a manner as to produce the perforations 4 for regular forward feed of the belt. The latter then passes into the perforating station B which excises the notches appropriate for later positioning of the hairpin-shaped connections. The connecting hairpins are then produced in the required shape during stage C of the process. To this end, a spool 30 of wire 31 is unreeled, the wire being reeved through the guides 32, 33 and 34. The wire is then guided by means of the tool 38 through slots such as 42 of the perforated belt 7. The wire 31 then assumes the shape of the tool 38 equipped with two convex parts 39. This wire is applied against the tool 38 by means of the press 36, enabling production of the hairpins 16 after cutting the wire by means of the cutting tool 35. (It should be noted that a number of modified forms may be produced at this stage of the process. For example, a predetermined wire length may be cut and stored on a carrier (not shown) prior to forming the hairpin. The convex parts of the hairpin may thereupon be produced simultaneously or successively by means of the tool 38 and press 36). The belt 7 is then fed forward step by step by means of perforations such as 43. The connections in the form of a hairpin 16 having been produced and placed in position on the perforated belt 7 in this manner, they are then displaced for stage D of the process in the direction towards the station 44, 45 for soldering the component 3 to the said hairpin-shaped connection 16. This stage D of the process, as well as the means 44 and 45 for application of this stage, will be examined more particularly in FIGS. 2A to 2E. The hairpins 16 and the belt which had been horizontal until then, undergo a twist through 90° in such a manner as to place the said hairpins and the component soldered to their extremities in a vertical plane, the component being situated at the base of the belt 7. At the same time, a turning platform 49 equipped with recesses 48 is displaced in alignment with the said components. Prior to passing below the components, the recesses 48 are loaded with a housing 47 partly filled with liquid resin by the station 46. The quantity of liquid should not be too great, so as to prevent overflows after insertion of the component. When a component is situated above the housing 47, the arm 50 lowers the latter via the hairpin 16 and the component is located in the housing. The arm 50 is then raised to return the hairpin 16 to the same level as the other hairpins, these now holding a housing at their extremity. The belt 7 as well as the tilting platform 49 are then fed forward by a step and the process is restarted. This stage of insertion of the component into the housing is the stage F of the process. The component then equipped with its housing is would up during stage G of the process on a mandrel 51. In FIG. 1, the direction of feed of the belt 7 and of the components is illustrated by the arrow K.

Different operations occurring during stage D of the process, as illustrated in FIG. 1, are depicted in FIGS. 2A to 2E, wherein the same elements as those of the preceding figure bear the same references.

In FIG. 2A, the station 44 comprises the elements 8 and 9 movable with respect to each other. The element 8 has a cavity 60 into which is inserted the extremity 22 of the hairpin 16. The station 45 comprises a device 4 for grasping the capacitor 2, two movable grippers 1 and 2, a spreader 10, as well as two centring elements 5 and 6. In FIGS. 2A to 2D are successively shown the different stages of the process, FIG. 2E being a view from above of FIG. 2C. In FIG. 2A, the device 4 for grasping the capacitor 3 tilts into a horizontal position, whereupon the grippers 1 and 2 are displaced in the direction of the arrows shown in the figure, to enable a subsequent displacement of the hairpin 16 in the horizontal plane, whilst the spreader 10 is placed between the convex parts 17 and 18 (FIG. 2E) of the hairpin 16. This spreader is formed (FIG. 2E) by two parallel and vertical rods placed side by side, of which the mutual spacing at the stage of operation of FIG. 2A is smaller than the distance between the two convex parts 17 and 18 of the hairpin but greater than the distance separating the parallel portions 20 and 21 of the hairpin 16 (the distance between the parts 62 and 63 of the hairpin 16 (FIG. 2E) is smaller than or equal to—prior to spreading apart—the distance between the lateral sides of the capacitor 3 on which the said parts 62 and 63 are to be soldered). In FIG. 2B, the station 44 is displaced towards the right in the figure in the direction of the arrow. The hairpin 16 is drawn along in this displacement and is displaced horizontally by means of the holding devices 5 and 6. The spreaders 10, which remain stationary, are then engaged between the branches 20 and 21 of the hairpin 16, in such a manner as to increase the distance between the extremities 62 and 63 of the hairpin 16. The grippers 1 and 2 are then displaced horizontally (in the direction of the arrows in FIG. 2C) drawing along with them the capacitor 3 which has its lateral sides placed between the extremities 62 and 63 of the hairpin 16. The case of FIG. 2E, with the central hairpin, is then applicable. The grasping devices 4 may then be raised upright (FIG. 2C, direction of the arrow) to fetch another workpiece for the next connecting operation. At the same time (FIG. 2E), the soldering electrodes 13 and 14 solder the extremities 62 and 63 to the lateral surfaces of the capacitor 3 whilst the spreaders 10 come closer to each other to avoid counteracting the forces exerted by the soldering electrodes 13 and 14. Whilst the extremities 62 and 63 are held by the electrodes 13 and 14, two hammers 11 and 12 strike the convex parts 17 and 18 of the hairpin 16, in such a manner that the distance between these convex parts is brought to a predetermined value. This this end, the said hammers are simply displaced in each other's direction and come to a stop against the corresponding electrodes, the adjustment of the stops making it possible to arrest the displacement of the hammers when they are at a distance equal to the predetermined value. These hammers 11 and 12 thereupon regain their initial position and the hairpin 16 is then returned to its initial position of FIG. 2A. For this purpose (FIG. 2D), the element 9 of station 44 is lowered into contact with the element 8, in such a manner as to insert the spindle 61 between the two branches 20 and 21 of the hairpin 16. The pair of elements 8 and 9 is then drawn back in the direction shown in FIG. 2D, whilst in its movement entraining the hairpin 16 to which the capacitor 3 is connected. At the end of this displacement, the hairpin 16 equipped with its capacitor 3 is then in the position depicted by the upper hairpin of FIG. 2E.

FIG. 3A in particular illustrates an unfinished stage of electronic components, more specifically capacitors, produced according to the process of the invention prior to its enclosure within a housing, illustrated in FIG. 3B. In FIG. 3A, the hairpin 16 has two parallel branches 20 and 21 connected at a first extremity by a rounded portion 22. Each branch 20, 21 has a convex part 17, 18 of which the overall width after connection of the hairpin to the capacitor 3 has a predetermined value d. Each convex part 17, 18 is again extended by a straight part 62, 63 these two parts being substantially parallel. These are joined by soldering to the capacitor 3 on its lateral surfaces (the convex parts may be of optional shape: it is sufficient for these to have a part projecting with respect to the component).

FIG. 3B shows the semi-finished form of the component of FIG. 3A enclosed within a protective housing. The same elements as those of FIG. 3A bear the same references. This protective housing 15 shown in cross-section in the figure parallel to the plane of the hairpin 16, has a distance e between its parallel lateral surfaces 65 and 66 (this housing is of rectangular parallelepipedal form and only a cross-section of the whole is illustrated in FIG. 3B). The convex parts 17 and 18 of the hairpin 16 are in contact, at the points 67 and 68 respectively, with the corresponding sidewalls of the housing 15. The whole of the housing 15 is filled with a solidified resin 23, which finally and rigidly holds together the housing and the unfinished capacitor. The distance e between the sidewalls of the parallelepipedal housing 15 is a little smaller than the distance d between the convex parts 17 and 18 of the hairpin 16 as illustrated in FIG. 3A. Because of this, by a spring action produced by the portion 22 of the hairpin 16 and the parts 62 and 63 soldered to the capacitor 3, the semi-finished product and the housing are held joined together even before solidification of the resin. To obtain this result, one skilled in the art will be able by simple handling actions of routine nature to determine the distance d as a function of the distance e and of the different materials utilised for the hairpin 16 and the housing 15.

FIG. 4 illustrates a view in cross-section of a modified housing usable with the component of the invention. This cross-sectional view is taken at the level of the points of contact 67 and 68 of the housing and of the connections. The outline of the capacitor 3 has been illustrated by dashed lines. Each branch 20 and 21 is engaged in a notch formed by two parallel surfaces, respectively 71, 72 and 73, 74. Depending on the result required, (guiding or securing), the distance between the parallel sides will be greater or smaller than the diameter of the branches 20 and 21. The distance between two opposed surfaces (such as 71 and 73) will be greater than the width of the component 3 to allow of its insertion into the housing 15.

I claim:

1. A process for the production of an electronic component wherein electrical connections are soldered to the lateral walls of the component, after which the latter is introduced into a housing and a solidifiable resin is cast into this latter, in which the connections are firstly produced in the form of a hairpin comprising two parallel branches interconnected by means of their first extremity whereafter a convex part is formed on each branch towards their second extremities in such a manner that after soldering the second extremities to the lateral walls of the component, the distance between the convex parts and their position on each of the branches permits their insertion together with the component into the housing, the friction of the said convex parts against the inner surfaces of the housing being sufficient to hold the housing and the component together.

2. A process for production of an electronic component according to claim 1, in which the formation of the convex parts of each branch occurs successively.

3. A process for production of an electronic component according to claim 1, in which the formation of the convex parts of each branch is performed simultaneously.

4. A process for production of an electronic component according to claim 1, in which each hairpin is then attached to a belt provided with perforations after being formed.

5. A process for production of an electronic component according to claim 4, in which each hairpin is displaced parallel to the plane of the belt before and after the component is soldered.

6. A process for production of an electronic component according to claim 1, in which the distance between the second extremities of the hairpins is smaller than or equal to the distance between the lateral surfaces of the component, and the branches of the hairpin are spread apart before placing the lateral surfaces of the component between these, the said branches thereupon each bearing on the corresponding surface.

7. A process for production of an electronic component according to claim 6, in which soldering electrodes are applied on the second extremities of the branches of the hairpins to solder and hold fast the said branches whilst the convex parts have applied to them means to bring the distance between them to a predetermined value exceeding the distance separating the inner surfaces of the housing.

8. A process for production of an electronic component according to claim 1, in which after soldering the electrical connections, the component is inserted downwards from the top into a housing having a single upwardly directed open side.

9. A process for production of an electronic component according to claim 8, in which the housing is first partially filled with solidifiable resin.

10. A process for production of an electronic component according to claim 8, in which the housing is partially or totally filled with solidifiable resin after insertion of the component.

11. An apparatus for application of the process according to claim 1, said apparatus comprising means for displacing the hairpin, means for spreading apart the branches of the hairpin, means for placing a component between the spread-apart extremities of the branches of the hairpin, means for soldering the said extremities on the lateral surfaces of the component, and means for establishing the distance between the convex parts of the hairpin at the required dimension.

12. An electronic component comprising at least two lateral surfaces to which are soldered the second extremities of an electrical connection in the form of a hairpin comprising two parallel branches interconnected at their first extremity, in which on each of its branches and close to their second extremity, the said hairpin has a convex part, the distance between the said convex parts having a predetermined value (d) greater than the distance between the two lateral surfaces of the component.

13. An electronic component comprising at least two lateral surfaces to which are soldered the second extremities of an electrical connection in the form of a hairpin comprising two parallel branches interconnected at their first extremity, in which on each of its branches and close to their second extremity, the said hairpin has a convex part, the distance between the said convex parts having a predetermined value (d) greater than the distance between the two lateral surfaces of the component, and further including a parallelepipedal housing enclosing said lateral surfaces of said component, the convex parts of the branches respectively bearing on two inner surfaces of the housing of which the distance (e) is a little smaller than that (d) separating the convex parts, but greater than the distance between the distance between the lateral surfaces of the component.

14. An electronic component according to claim 13 in which a resin fills the empty space between the housing and the component, embedding the convex parts of the branches of the hairpin.

15. An electronic component according to claim 13, in which the housing comprises internal notches for guiding and securing the convex parts of the branches of the hairpin.

16. A process for producing an electronic component comprising the steps of:
   (1) producing connections in the shape of a hairpin, said connections comprising first and second parallel branches, said first and second parallel branches each including a first and a second extremity, said first extremity of said first branch connected to said first extremity of said second branch;
   (2) forming a first convex part in said first branch a predetermined distance from said second extremity of said first branch, and forming a second convex part in said second branch a predetermined distance from said second extremity of said second branch;
   (3) soldering said second extremity of said first branch to a first surface of a component, and soldering said second extremity of said second branch to a second surface of said component, said first and second surfaces opposing one another;
   (4) disposing said component in a housing, said housing including at least first and second inner walls defining a cavity, the friction between said first and second convex parts and said first and second inner walls retaining said component in said housing; and
   (5) disposing a solidifiable resin into said housing.

17. A process as in claim 16 wherein said forming step (2) forms said first convex part before forming said second convex part.

18. A process as in claim 16 wherein said forming step (2) forms said first and second convex parts simultaneously.

19. A process as in claim 16 further comprising the step of disposing said first and second branches onto a perforated belt.

20. A process as in claim 19 wherein said soldering step (3) further includes the step of displacing said first and second branches a predetermined angle from the plane of said belt.

21. A process as in claim 16 wherein:
   said producing step (1) includes the step of displacing said first and second branches relative to one another such that the distance between said first and second surfaces of said component exceeds the distance from said second extremity of said first branch to said second extremity of said second branch; and
   said soldering step (3) includes the step of displacing said second extremity of said first branch relative to said second extremity of said second branch such that the distance between said second extremities exceeds the distance between said first and second surfaces of said component.

22. A process as in claim 21 wherein said soldering step (3) further includes the steps of:
   applying soldering electrodes to each of said branches; and
   displacing said first convex part a predetermined distance from said second convex part, said displaced predetermined distance between said first and second convex parts greater than the distance between said first and second inner walls of said housing.

23. A process as in claim 22 wherein said convex part displacing step of said soldering step (3) includes the step of striking said first and second convex parts with hammers.

24. A process as in claim 21 wherein said first and second branches displacing step of said soldering step (3) includes the step of spreading said first and second branches apart.

25. A process as in claim 16 wherein said disposing step (4) includes the step of displacing said component vertically downward into said housing, said housing defining an upwardly-directed opening.

26. A process as in claim 16 further including the step of partially filling said housing with said solidifiable resin before said disposing step (4) is performed.

* * * * *